US009629023B2

(12) United States Patent
Nagata et al.

(10) Patent No.: US 9,629,023 B2
(45) Date of Patent: Apr. 18, 2017

(54) USER APPARATUS AND COLLISION DETECTION METHOD

(71) Applicant: NTT DOCOMO, INC., Tokyo (JP)

(72) Inventors: Satoshi Nagata, Tokyo (JP); Qun Zhao, Beijing (CN); Yongbo Zeng, Beijing (CN); Yongsheng Zhang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/781,713

(22) PCT Filed: Mar. 13, 2014

(86) PCT No.: PCT/JP2014/056701
§ 371 (c)(1),
(2) Date: Oct. 1, 2015

(87) PCT Pub. No.: WO2014/162836
PCT Pub. Date: Oct. 9, 2014

(65) Prior Publication Data
US 2016/0066211 A1 Mar. 3, 2016

(30) Foreign Application Priority Data
Apr. 4, 2013 (JP) ................................. 2013-079025

(51) Int. Cl.
*H04W 28/04* (2009.01)
*H04W 8/00* (2009.01)
(Continued)

(52) U.S. Cl.
CPC ............ *H04W 28/046* (2013.01); *H04L 1/00* (2013.01); *H04W 8/005* (2013.01); *H04W 76/022* (2013.01); *H04W 92/18* (2013.01)

(58) Field of Classification Search
CPC .................................................. H04W 28/046
See application file for complete search history.

(56) References Cited

U.S. PATENT DOCUMENTS 8,331,965 B2   12/2012   Richardson
8,743,823 B2    6/2014   Richardson et al.
(Continued)

FOREIGN PATENT DOCUMENTS

EP   2397010 A1   12/2011
EP   2441311 A1    4/2012
(Continued)

OTHER PUBLICATIONS

International Search Report issued in corresponding application No. PCT/JP2014/056701 mailed Apr. 15, 2014 (3 pages).
(Continued)

Primary Examiner — Christopher M Brandt
(74) Attorney, Agent, or Firm — Osha Liang LLP

(57) ABSTRACT

A user apparatus that transmits and receives a discovery signal, including: collision detection means that detects a collision in a received discovery signal; collision notification means that, when a collision of a received discovery signal is detected by the collision detection means, transmits collision information indicating that a collision occurs in the received discovery signal; collision information reception means that receives collision information; and collision determination means that determines whether a collision occurs in a transmitted discovery signal transmitted by the user apparatus based on the collision information received by the collision information reception means.

10 Claims, 15 Drawing Sheets

(51) Int. Cl.
*H04W 76/02* (2009.01)
*H04L 1/00* (2006.01)
*H04W 92/18* (2009.01)

(56) References Cited

U.S. PATENT DOCUMENTS

2010/0202400 A1    8/2010   Richardson et al.
2013/0114448 A1*   5/2013   Koo .................... H04W 24/00
                                                        370/252

FOREIGN PATENT DOCUMENTS

WO    2010/093874 A1    8/2010
WO    2010/144826 A1    12/2010

OTHER PUBLICATIONS

Written Opinion issued in corresponding application No. PCT/JP2014/056701 dated Apr. 15, 2014 (8 pages).

* cited by examiner

STEP 1

STEP 2

STEP 3

USER APPARATUS AND COLLISION DETECTION METHOD

TECHNICAL FIELD

The present invention relates to terminal to terminal communication. More particularly, the present invention relates to a technique for detecting a collision of discovery signals in the terminal to terminal communication.

BACKGROUND ART

In a mobile communication system, it is common that a terminal (to be referred to as user apparatus UE hereinafter) and a base station BS performs communication so that communication is performed between user apparatuses UE. However, in recent years, various techniques are considered for performing direct communication between user apparatuses UE.

When performing communication between user apparatuses UE, it is necessary that a user apparatus UE discovers another neighboring user apparatus UE. The present application is on the discovery of the user apparatus UE in this user apparatus UE to user apparatus UE communication.

As a method for discovering a user apparatus UE, there is a method in which each user apparatus UE transmits (broadcasts) a discovery signal including its own ID (identification information). For example, as shown in FIG. 1, in a case where a user apparatus UE-A transmits a discovery signal including its own identification information and a user apparatus UE-B receives the discovery signal, the user apparatus UE-B discovers the user apparatus UE-A by determining that there is the identification information of the user apparatus UE-A in the discovery signal. By the way, as an example, the user apparatus UE-B that has discovered the user apparatus UE-A, directly or via the base station BS, reports, to the user apparatus UE-A, that the user apparatus UE-B has discovered the user apparatus UE-A, so that the user apparatus UE-B communicates with the user apparatus UE-A. As conventional techniques, there are techniques described in patent documents 1-4.

RELATED ART DOCUMENT

Non-Patent Document

Patent Document 1: US20100202400
Patent Document 2: EP2397010A1
Patent Document 3: U.S. Pat. No. 8,331,965B2
Patent Document 4: EP2441311A1

SUMMARY OF THE INVENTION

Problem to be Solved by the Invention

Here, in a case where a plurality of neighboring user apparatuses UE select the same resource (radio resource formed by time and frequency, that is, a resource block defined in LTE, for example) to transmit discovery signals, the discovery signals interfere with each other to cause a collision.

For example, as shown in FIG. 2, it is assumed that each of the user apparatus UE-A and the user apparatus UE-B transmits a discovery signal by selecting the same resource, and that the user apparatus UE-C receives each discovery signal. For example, it is assumed that the received power of the discovery signal of the user apparatus UE-A at the user apparatus UE-C is −85 dBm, and that the received power of the discovery signal of the user apparatus UE-B is −86 dBm. In this case, if there is no collision, the user apparatus UE-C can detect each discovery signal. However, since a collision occurs, the user apparatus UE-C cannot detect any of the discovery signals of the user apparatus UE-A and the user apparatus UE-E. Collision of discovery signals lowers success probability of discovery, increases delay, so as to uselessly consume power of the user apparatus UE.

As a conventional technique, there is a technique in which a user apparatus UE that transmits a discovery signal using a resource observes a discovery signal of the same resource transmitted by another user apparatus in order to detect a collision. In this conventional technique, as shown in FIG. 3, although a collision occurs at the user apparatus UE-C of the receiving side, a collision is to be detected by the user apparatuses UE-A and UE-B of the transmitting side. This conventional technique has the following problem.

For example, as shown in FIG. 4, a situation is assumed in which, there is a wall between a user apparatus UE-A and a user apparatus UE-B, and the wall blocks communication between the user apparatus UE-A and the user apparatus UE-B, but, a user apparatus UE-C exists outside the wall so that the user apparatus UE-C can receive signals from the user apparatus UE-A and the user apparatus UE-B. In this case, if each of the user apparatus UE-A and the user apparatus UE-B transmits a discovery signal using the same resource, the user apparatus UE-B (user apparatus UE-A) cannot observe a discovery signal from the user apparatus UE-A (user apparatus UE-B). Thus, a collision of the discovery signals at the user apparatus UE-C cannot be detected.

Also, for example, as shown in FIG. 5, although "collision" does not occur for a discovery signal from the user apparatus UE-B since any user apparatus UE does not exist in the dashed line area where a discovery signal from the user apparatus UE-B should be detected, the user apparatus UE-B erroneously recognizes that a collision occurs by observing a signal from the user apparatus UE-A.

The present invention is contrived in view of the above points and an object of the present invention is to provide a technique for detecting collision of a discovery signal in a user apparatus that receives a discovery signal so as to enable a user apparatus that transmits the discovery signal to detect the collision, in a terminal to terminal communication technique for discovering a user apparatus by transmitting and receiving a discovery signal.

Means for Solving the Problem

For solving the problem, according to an embodiment of the present invention, there is provided a user apparatus that transmits and receives a discovery signal, including:

collision detection means that detects a collision in a received discovery signal;

collision notification means that, when a collision of a received discovery signal is detected by the collision detection means, transmits collision information indicating that a collision occurs in the received discovery signal;

collision information reception means that receives collision information; and collision determination means that determines whether a collision occurs in a transmitted discovery signal transmitted by the user apparatus based on the collision information received by the collision information reception means.

Also, according to an embodiment of the present invention, there is provided a collision detection method executed by a user apparatus that transmits and receives a discovery signal, including:

a collision detection step of detecting a collision in a received discovery signal; and a collision notification step of, when a collision of a received discovery signal is detected by the collision detection step, transmitting collision information indicating that a collision occurs in the received discovery signal.

In the collision detection method, when detecting a collision in a transmitted discovery signal, the collision detection method includes:

a collision information reception step of receiving collision information; and a collision determination step of determining whether a collision occurs in a transmitted discovery signal transmitted by the user apparatus based on the collision information received by the collision information reception step.

Effect of the Present Invention

According to an embodiment of the present invention, in a terminal to terminal communication technique for discovering a user apparatus by transmitting and receiving a discovery signal, a technique is provided for detecting a collision of a discovery signal in a user apparatus that receives a discovery signal so as to enable a user apparatus that transmits the discovery signal to detect the collision.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

Outline of Embodiments

In the present embodiment, a user apparatus UE in a reception side of a discovery signal detects a collision. The user apparatus UE detecting the collision notifies a user apparatus UE in a transmission side of occurrence of the collision of the discovery signal. The user apparatus UE that receives notification of the collision resolves the collision by the after-mentioned method.

Figure 6:
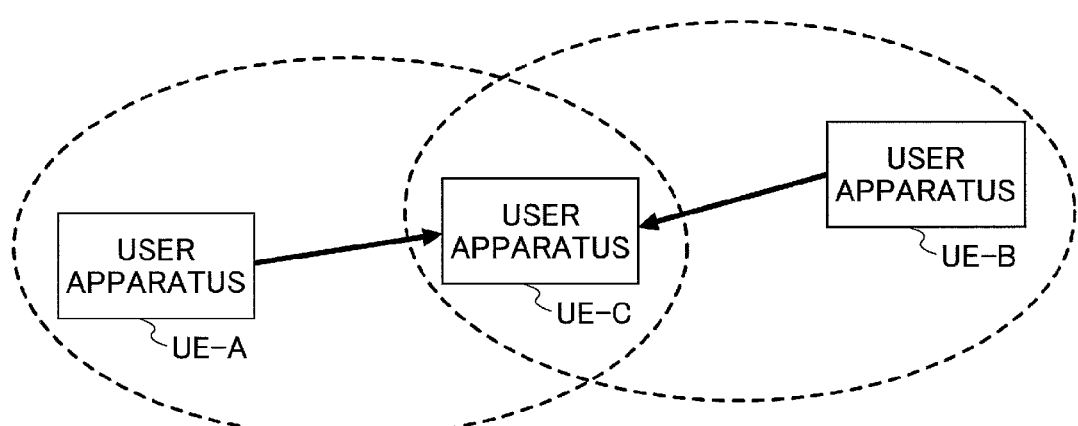
FIG. 6 is a diagram for explaining a basic process procedure in an embodiment of the present invention.
Figure 7:
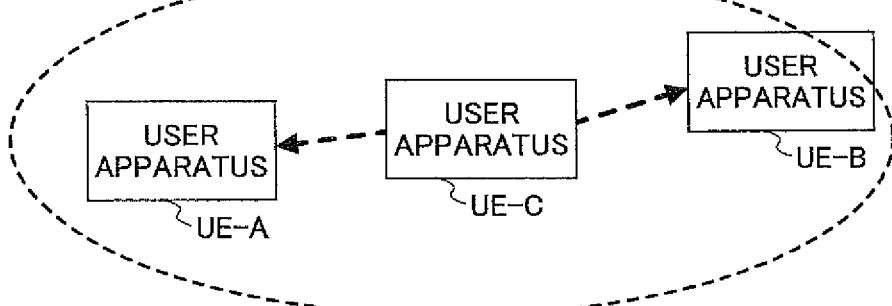
FIG. 7 is a diagram for explaining a basic process procedure in an embodiment of the present invention.

A basic process procedure of the present embodiment is described with reference to FIGS. 6-8. As shown in FIG. 6, in step 1, the user apparatus UE-C detects occurrence of a collision by detecting an error of reception although detecting high received energy (high received power, high received strength, and the like), for example. In step 2 shown in FIG. 7, the user apparatus UE-C that has detected the collision notifies neighboring user apparatuses UE (including user apparatus UE-A and user apparatus UE-B) of occurrence of the collision. The signal for this notification includes information of a resource on which the collision is detected. Also, the signal may include information of a place where and a time when the collision was detected.

Figure 8:
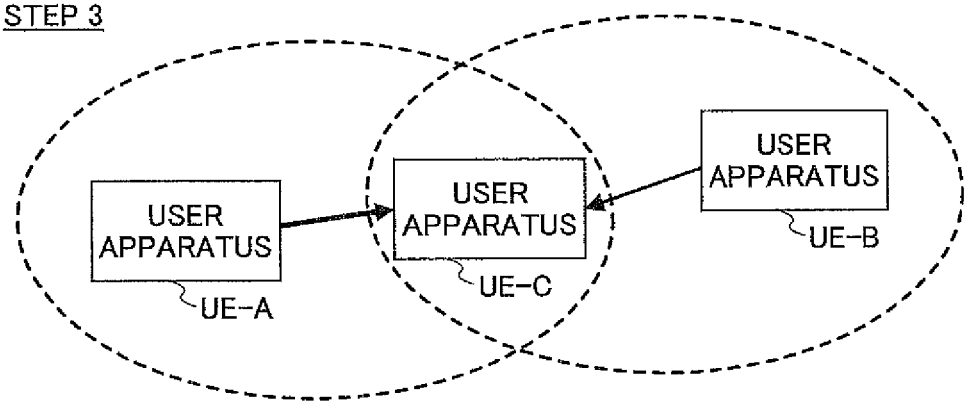
FIG. 8 is a diagram for explaining a basic process procedure in an embodiment of the present invention.

In step 3 shown in FIG. 8, the user apparatus UE-A and the user apparatus UE-B that have received the notification from the user apparatus UE-C recognize the occurrence of the collision at the resource selected by them, so as to retransmit a discovery signal by reselecting a transmission resource, for example.

In the following, techniques of the embodiment of the present invention are described in more detail.

First Embodiment

Process Content

In the present embodiment, a user apparatus UE that detects a collision transmits (broadcasts) a collision indicator together with a discovery signal. The collision indicator of the present embodiment is an optional message segment in a discovery signal, for example, and it appears only when a collision is detected. Also, the collision indicator includes information (resource ID) indicating a resource where the collision is detected. Further, in a case where, although a collision is detected, there is an ID of a user apparatus UE that can be recognized, the ID or information corresponding to the ID may be included in the collision indicator.

In the following, a first example and a second example are described. In the example described below, it is assumed that, by assigning a resource ID to each resource (example: 1 resource block defined in LTE) for transmitting a discovery signal, a resource on which a discovery signal is transmitted can be uniquely identified.

Figure 9:
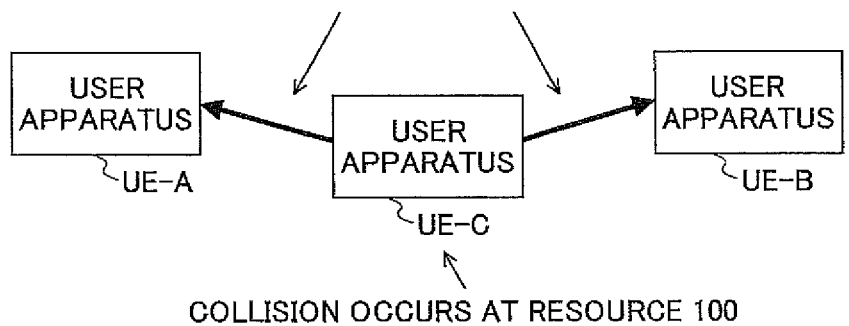
FIG. 9 is a diagram showing a first example in a first embodiment.

FIG. 9 shows a first example. In this example, both of a discovery signal of the user apparatus UE-A and a discovery signal of the user apparatus UE-B are transmitted by a resource of a resource ID=100. The user apparatus UE-C detects a collision of these discovery signals at the resource of the resource ID=100, and transmits (broadcasts) a discovery signal including a collision indicator indicating the resource ID (100). The transmitted discovery signal is received by the user apparatus UE-A and the user apparatus UE-B, and, the user apparatus UE-A and the user apparatus UE-B determine that there is a collision at the resource used by them, so that operation for resolving the collision is performed as described later.

For example, it is predefined that a discovery period comes periodically in which discovery (being discovered) of a user apparatus UE is performed by transmitting and receiving a discovery signal. When it is assumed that there are 2816 discovery resources (example: resource blocks) in each discovery period, 12 bits are enough for the collision indicator for sending the resource ID.

Figure 10:
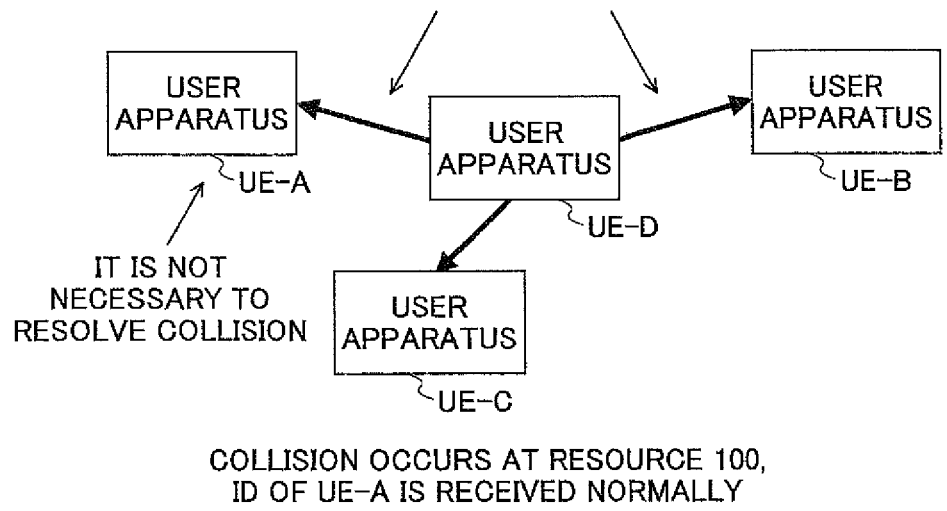
FIG. 10 is a diagram showing a second example in the first embodiment.

FIG. 10 shows a second example. In this example, each of the user apparatuses UE-A, UE-B and UE-C transmits a discovery signal using a resource of a resource ID=100, and a user apparatus UE-D detects a collision at the resource. However, in this case, the user apparatus UE-D detects an ID of the user apparatus UE-A included in the discovery signal transmitted by the user apparatus UE-A. In this case, as shown in FIG. 10, the user apparatus UE-D transmits a collision indicator by including, in the collision indicator, the resource ID where the collision is detected and information of the ID of the user apparatus UE-A (checksum of the ID in this example). Accordingly, the user apparatus UE-A that receives the discovery signal including the collision indicator can recognize that it is not necessary to perform the process of collision resolution since the discovery signal of the user apparatus UE-A has been correctly received by the user apparatus UE-D.

Also, for example, when a plurality of collisions are detected in a plurality of resources, the user apparatus UE may randomly select N (N is a natural number) collisions from the plurality of collisions, and transmit a discovery signal by inserting, in the discovery signal, a collision indicator having resource IDs of each resource and information of an ID of a user apparatus UE that has been detected.

Figure 11:
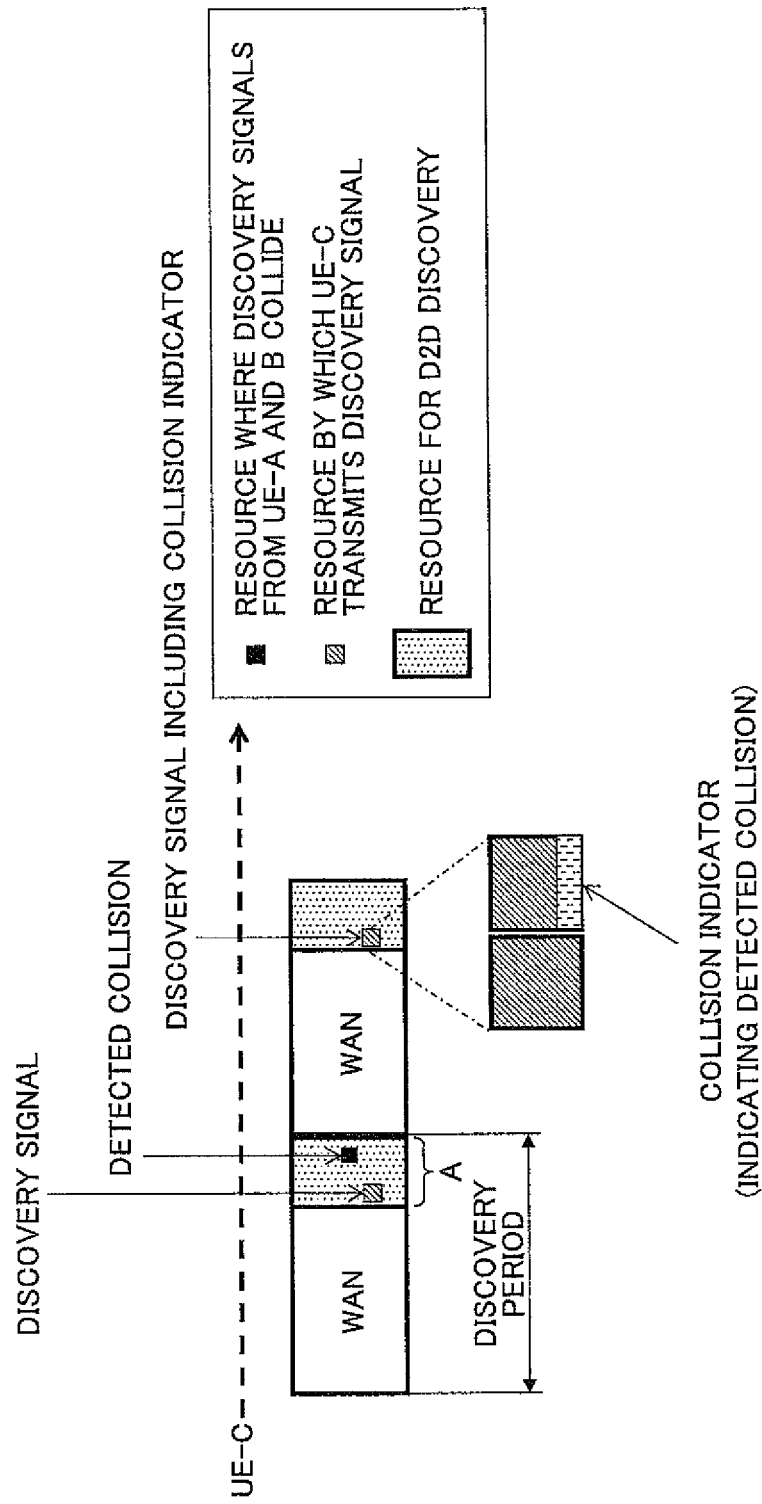
FIG. 11 is a diagram showing an example of a discovery signal in the first embodiment.

In the following, by referring to FIG. 11, a process procedure of the present embodiment is described in more detail. FIG. 11 is a diagram representing a resource of a signal in the present embodiment, and the lateral axis indicates time, and the vertical axis indicates frequency. As shown in FIG. 11, the resource is configured such that a period (example: period shown as A in FIG. 11, which can be referred to as a discovery period) comes at a constant cycle (discovery period) for performing discovery (D2D peer discovery) between terminals. Then, transmission and reception of a discovery signal are performed by using any of a plurality of resources (example: resource blocks defined in LTE) in the period.

For example, as shown in FIG. 9, it is assumed that the user apparatus UE-C detects a collision of discovery signals transmitted by the user apparatuses UE-A and UE-B. In this example, it is assumed that a collision is detected at a resource shown in FIG. 11. Then, the user apparatus UE-C generates a collision indicator. For example, as shown in FIG. 11, the user apparatus UE-C having the collision indicator inserts the collision indicator in the discovery signal of the user apparatus UE-C to transmit (broadcast) the discovery signal including the collision indicator at a discovery period of a next cycle of the cycle in which the collision is detected. In the example shown in FIG. 11, the collision indicator is inserted in one slot of a resource block which has two slots. That is, a part of resource elements in the resource of the discovery signal is used for collision indicator transmission.

As described before, the collision indicator includes a resource ID where the collision has occurred. In addition, the collision indicator may include information of an ID of a detected user apparatus UE.

In a case where, when there is information of an ID of a detected user apparatus, the information is included in the collision indicator, a user apparatus UE that receives a discovery signal including the collision indicator transmitted from the user apparatus UE-C determines that there is a collision in a discovery signal transmitted by itself so as to perform operation for collision resolution if the resource of the resource ID included in the collision indicator is a resource selected for transmission of the discovery signal by the user apparatus UE and the information of the ID of the user apparatus UE is not included in the collision indicator. An example of operation for collision resolution performed by the user apparatus UE that knows there is a collision in the discovery signal transmitted by itself is as follows.

Collision resolution operation example 1: The user apparatus UE transmits a discovery signal by selecting a resource different from a resource in which collision has occurred.

Collision resolution operation example 2: The user apparatus UE performs retransmission using the same resource or a different resource by using a modulation scheme of a smaller number of multiple level or by using a lower coding rate.

Collision resolution operation example 3: The user apparatus UE retransmits the discovery signal without change.

Collision resolution operation example 4: The user apparatus UE resolves interference between discovery signals by using a technique of interference suppression such as IRC (interference rejection combining) or interference cancelling, for example.

<Configuration of the User Apparatus UE>

Figure 12:
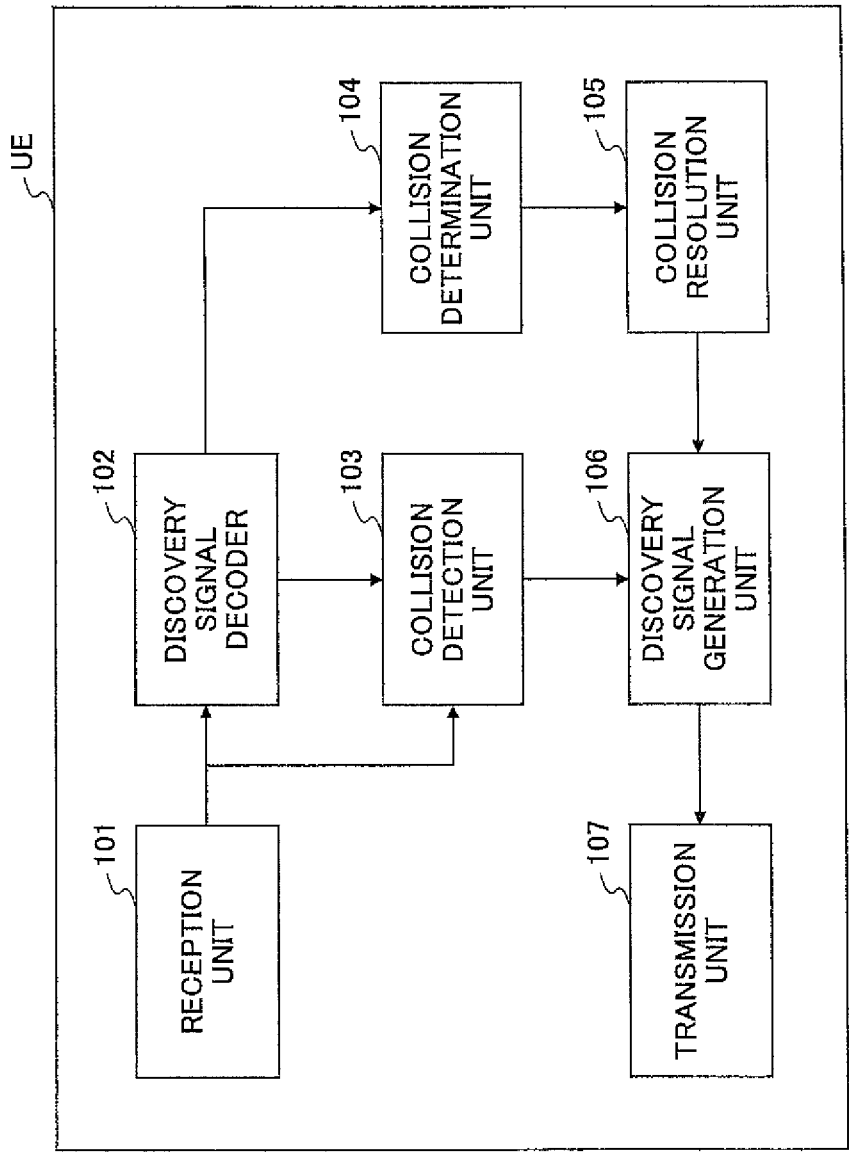
FIG. 12 is a functional block diagram of a user apparatus UE in the first embodiment.

FIG. 12 shows a functional block diagram of the user apparatus UE of the present embodiment. FIG. 12 especially shows functions related to collision detection and collision notification of discovery signals in the user apparatus UE. For example, the user apparatus UE may be further provided with a function necessary for the UE to operate as a UE complying with LTE (including LTE-Advanced).

As shown in FIG. 12, the user apparatus UE includes a reception unit 101, a discovery signal decoder 102, a collision detection unit 103, a collision determination unit 104, a collision resolution unit 105, a discovery signal generation unit 106, and a transmission unit 107. Functions of each function unit is as follows.

The reception unit 101 receives a discovery signal by using a radio resource. The discovery signal decoder 102 performs operation for extracting an ID of a user apparatus UE that transmits a discovery signal from a received discovery signal and extracting a collision indicator.

The collision detection unit 103 detects a collision in a received discovery signal. The method for detecting a collision is not limited to a specific method. For example, it may be determined that there is a collision when received energy (received power and the like) is higher than a case where one discovery signal is received. Also, a collision may be detected when a discovery signal is not correctly received (when correct information is not obtained) in the discovery signal decoder 102. Further, it may be determined that there is a collision when a discovery signal is not received correctly and the received energy (received power and the like) is higher than a case where one discovery signal is received.

The collision determination unit 104 determines whether there is a collision in a discovery signal transmitted by it (above-mentioned user apparatus UE) based on information included in a collision indicator when the collision indicator is included in a received discovery signal. The collision resolution unit 105 instructs the before-mentioned discovery signal generation unit 106 and the transmission unit 107 to perform, for example, the before-mentioned collision resolution operation when the collision determination unit 104 determines that there is a collision in the discovery signal transmitted by itself.

The discovery signal generation unit 106 generates a discovery signal. When a collision is detected in a received signal by the collision detection unit 103, the discovery signal generation unit 106 generates a discovery signal including a collision indicator including an ID of a resource in which the collision is detected. Also, when the collision detection unit 103 detects a collision and the discovery signal decoder 102 detects an ID of a user apparatus UE, the discovery signal generation unit 106 may generate a collision indicator including an ID of a resource where the collision is detected and information of an ID of the detected user apparatus UE, and generate a discovery signal including the collision indicator. The transmission unit 107 transmits the discovery signal generated by the discovery signal generation unit 106 using a given radio resource.

<Process Flow of the User Apparatus UE>

Figure 13:
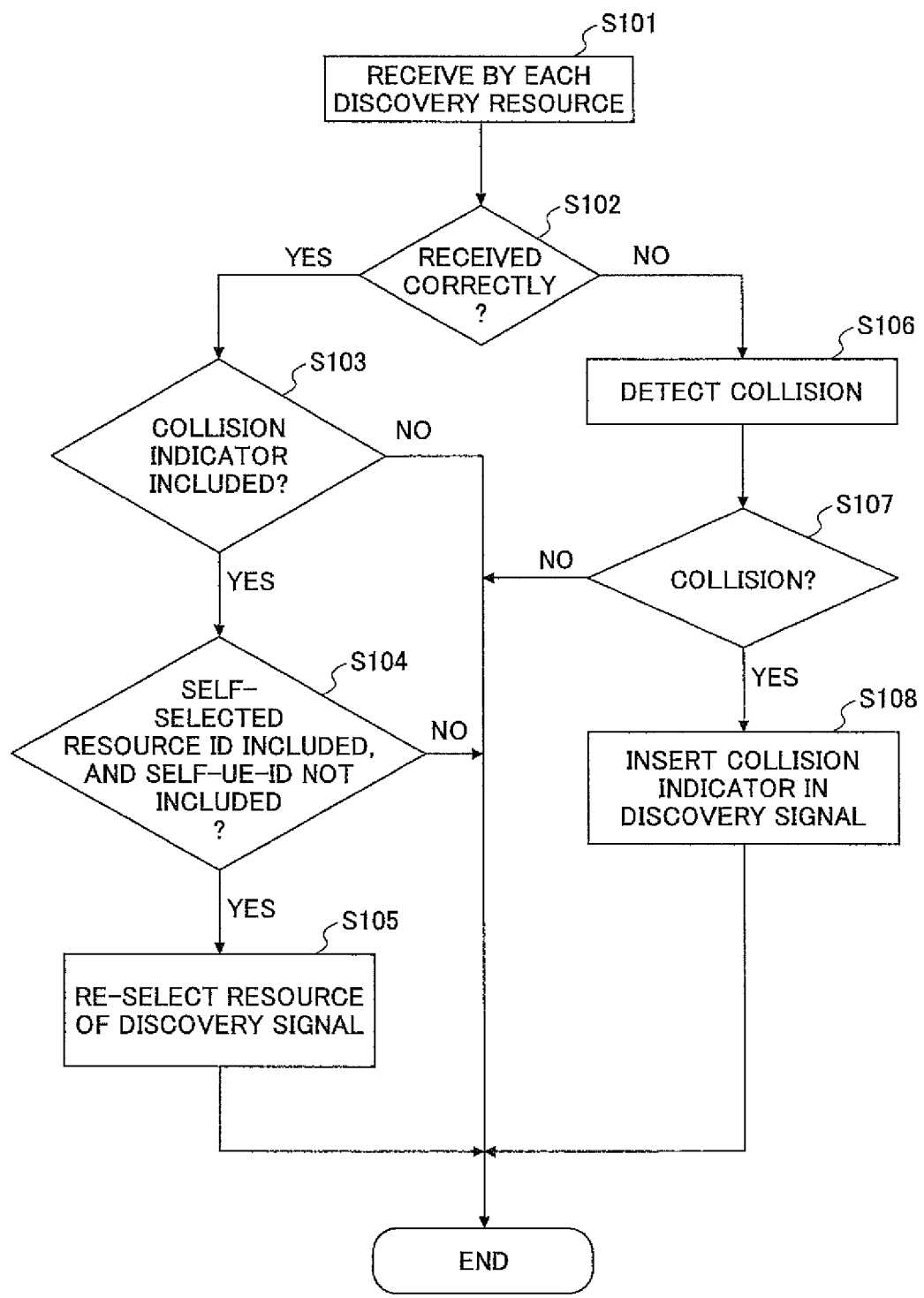
FIG. 13 is a flowchart showing operation of the user apparatus UE in the first embodiment.

Next, with reference to a flowchart of FIG. 13, an example of operation of the user apparatus UE in the present embodiment is described.

The user apparatus UE performs reception of a discovery signal in each resource (discovery resource) (step 101). When the discovery signal decoder receives all discovery signals correctly (Yes in step 102), the process goes to step 103, and when a discovery signal is not received correctly by the discovery signal decoder (No in step 102), the process goes to step 106.

In step 103 in a case where the discovery signal is correctly received, the collision determination unit 104 determines whether a collision indicator is included in the received discovery signal. When the collision indicator is included (Yes in step 103), the collision determination unit 104 determines whether the collision indicator includes a resource ID of a resource selected by the user apparatus UE for transmitting a discovery signal and the collision indicator does not include information of UE-ID of the user apparatus UE (step 104). In a case where the system is configured not to include information of UE-ID in the collision indicator, it may be determined that there is a collision when the collision indicator includes the resource ID of the resource selected by itself for transmitting a discovery signal.

When the determination of step 104 is Yes, it is determined that there is a collision in a discovery signal transmitted by itself. In this case the process goes to step 105, so that the user apparatus UE performs collision resolution operation. In this example, the user apparatus UE reselects a resource and transmits a discovery signal (step 105).

In step 106 in a case where the discovery signal is not correctly received, the collision detection unit 103 determines whether there is a collision based on the size of received energy (received power, received radio wave strength and the like) of a resource where the signal is received. When it is determined that there is a collision (Yes in step 107), the discovery signal generation unit 106 generates a discovery signal by inserting a collision indicator and the like having an ID of a resource where the collision is detected, so that the discovery signal is transmitted by the transmission unit 107 (step 108).

Second Embodiment

Process Content

In the first embodiment, the collision indicator is included in the discovery signal. On the other hand, in the present embodiment, a collision notification message for notifying collision detection information is transmitted separately from the discovery signal. Information to be included in the collision notification message is the same as the information to be included in the collision indicator described in the first embodiment. That is, an ID of a resource where a collision is detected is included in the collision notification message. Also, the ID of the resource where a collision is detected and information corresponding to an ID of a user apparatus that is detected when a collision occurs may be included.

When collisions in a plurality of resources are detected, IDs of a plurality of resources where collisions are detected, and information of an ID of a user apparatus that is detected in each resource may be included (only resource ID may be included). In the following, process examples in the second embodiment are described in more detail with reference to FIGS. 14 and 15.

As mentioned above, the user apparatus UE generates a collision notification message when detecting a collision in a received signal. The user apparatus UE may generate the collision notification message of the present embodiment only when detecting collisions (exceeding 10 collisions, for example) in a plurality of resources, and may use the method of the first embodiment when a small number of collisions (equal to or less than 10) are detected.

When the user apparatus UE has a collision notification message, the user apparatus UE selects a resource for transmitting the collision notification message. As to resource selection for transmitting the collision notification message, a first example and a second example are described as follows.

Figure 14:
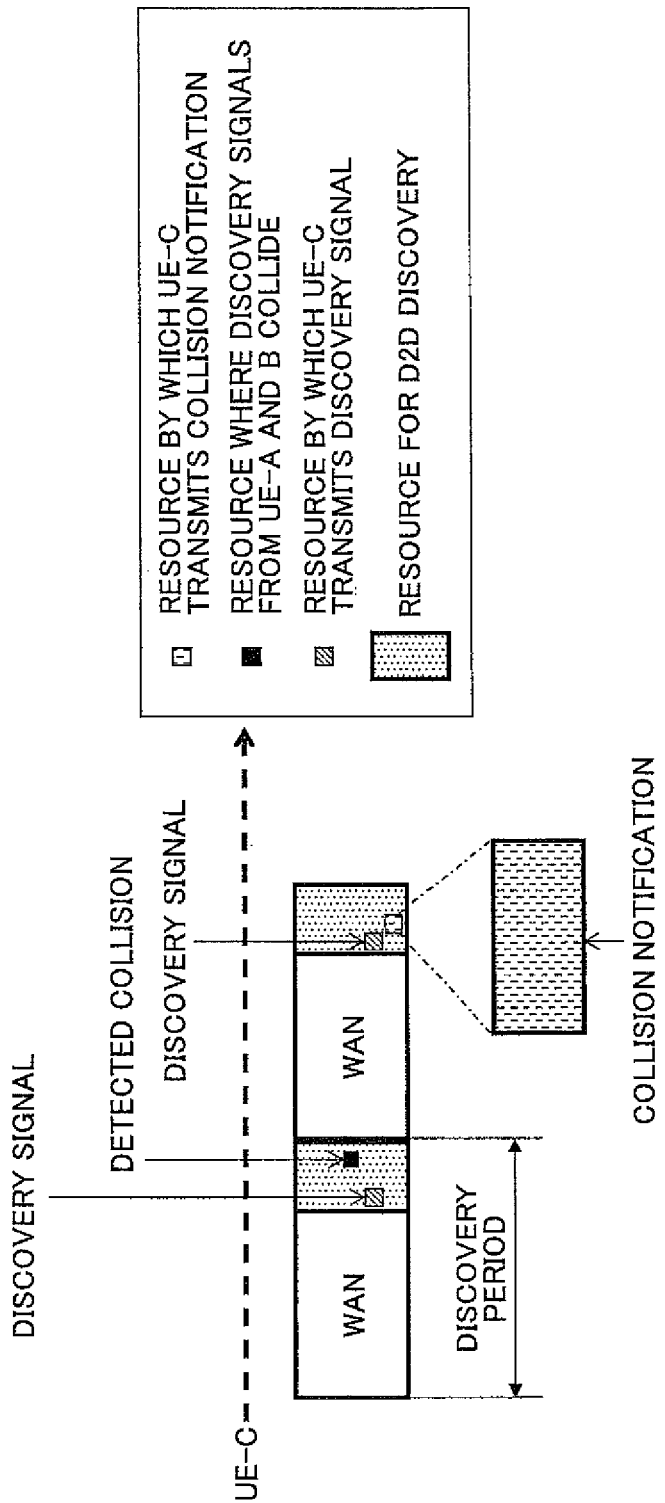
FIG. 14 is a diagram showing a first example in a second embodiment.

FIG. 14 is a diagram showing the first example. As shown in FIG. 14, in the first example, the user apparatus OF selects a new resource different from a resource selected for transmitting a discovery signal so as to transmit a collision notification message. Although a resource selection method for transmitting a collision notification message is not limited to a particular method, resource selection for transmitting the collision notification message may be performed by using a resource selection method for transmitting a discovery signal, for example.

Figure 15:
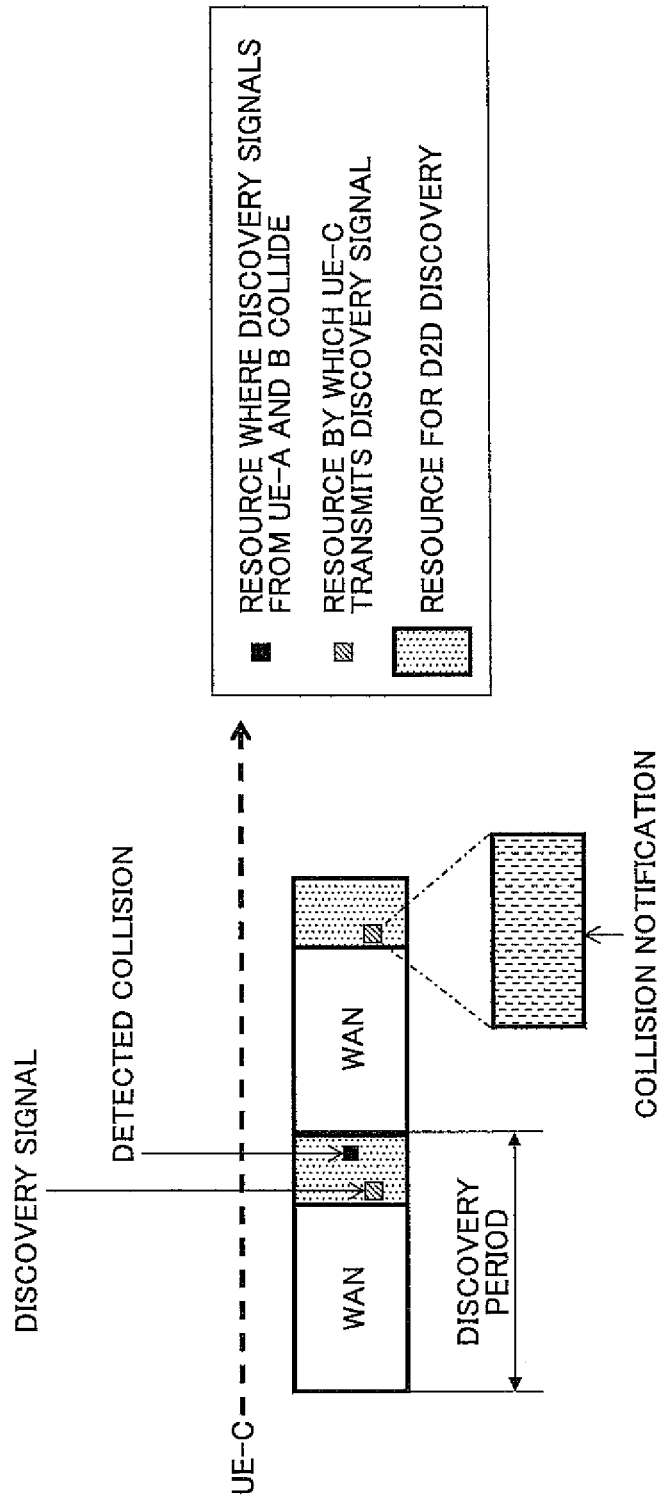
FIG. 15 is a diagram showing a second example in the second embodiment.

FIG. 15 is a diagram showing the second example. As shown in FIG. 15, in the second example, the user apparatus UE stops transmission of a discovery signal in a discovery period next to a discovery period where a collision is detected, and transmits a collision notification message using a resource for transmitting the discovery signal.

A user apparatus UE that receives the collision notification message transmitted from a user apparatus UE determines whether there is a collision in the discovery signal transmitted by itself in the same way as the user apparatus UE that receives a collision indicator in the first embodiment. Then, when it is determined that there is a collision, operation of collision resolution is performed in the same way as the first embodiment (before-mentioned collision resolution operation examples 1-4)

<Configuration of User Apparatus UE>

Figure 16:
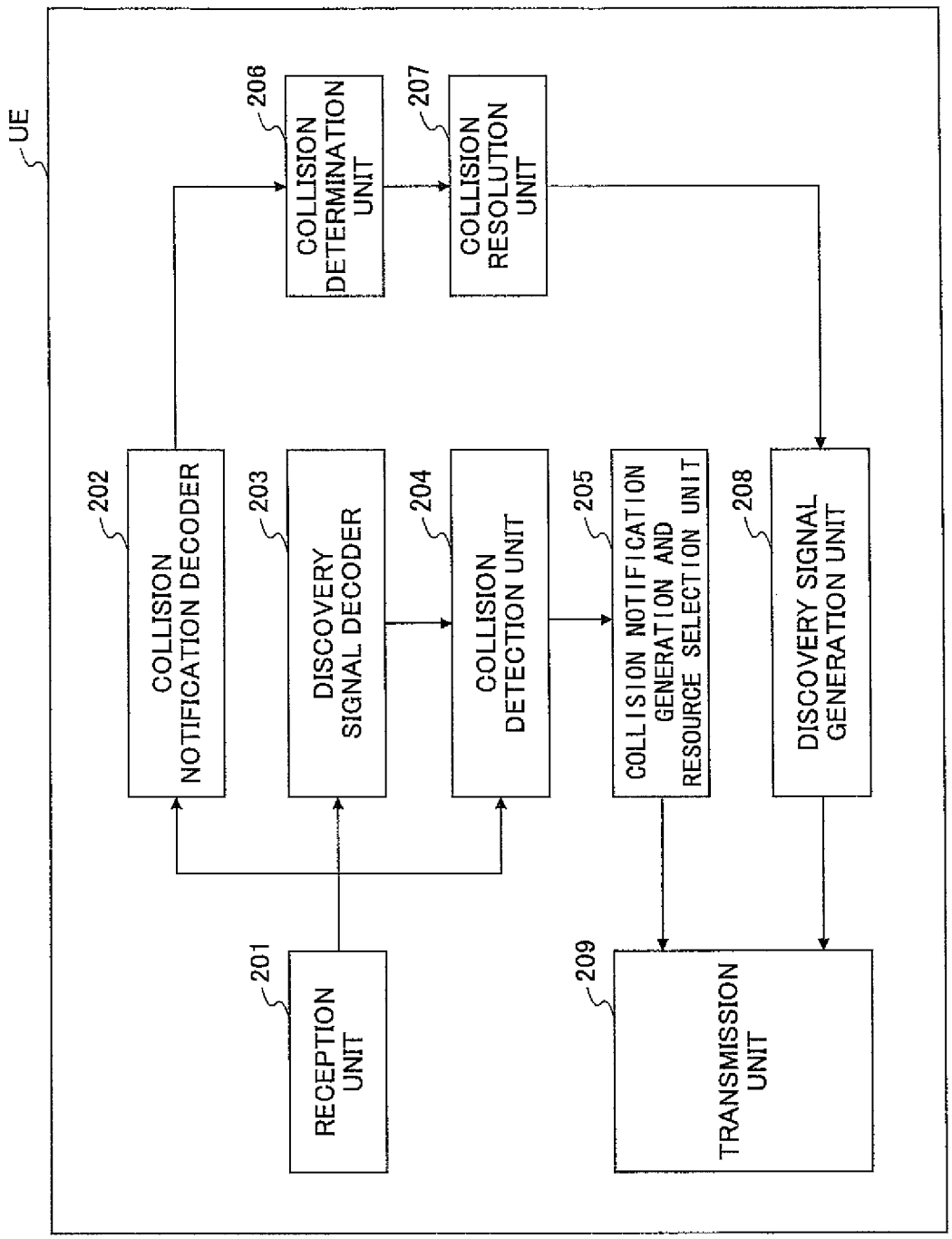
FIG. 16 is a functional block diagram of a user apparatus UE in the second embodiment.

FIG. 16 shows a functional block diagram of the user apparatus UE of the present embodiment. FIG. 16 especially shows functions related to collision detection and collision notification of discovery signals in the user apparatus UE. For example, the user apparatus UE may be further provided with a function necessary for the UE to operate as a UE complying with LTE (including LTE-Advanced).

As shown in FIG. 16, the user apparatus UE of the present embodiment includes a reception unit 201, a collision notification decoder 202, a discovery signal decoder 203, a collision detection unit 204, a collision notification generation and resource selection unit 205, a collision determination unit 206, a collision resolution unit 207, a discovery signal generation unit 208 and a transmission unit 209. Functions of each function unit is as follows.

The reception unit 201 receives a discovery signal and a collision notification message by using a given radio resource. The collision notification decoder 202 extracts resource ID, information corresponding to ID of UE and the like from the received collision notification message. The discovery signal decoder 203 performs processes for extracting an ID of a user apparatus that has transmitted a discovery signal from a received discovery signal.

The collision detection unit 204 performs detection whether there is a collision in a received discovery signal in the same way as the collision detection unit 103 of the first embodiment.

When a collision is detected in a received discovery signal, the collision notification generation and resource selection unit 205 generates a collision notification message having an ID of a resource where the collision is detected, and selects a resource for transmitting the collision notification message. In a case where a collision of a discovery signal is detected by the collision detection unit 204 and an ID of a user apparatus UE is detected by the discovery signal decoder 203, the collision notification generation and resource selection unit 205 may generate a collision notification message including an ID of a resource where the collision is detected and information of an ID of the detected user apparatus UE.

The collision determination unit 206 determines whether there is a collision in a discovery signal transmitted by itself by determining whether the ID of the resource included in the received collision notification message indicates the resource of the discovery signal transmitted by itself (above-mentioned user apparatus UE). Also, in a case where the system is configured to include information of an ID of a detected user apparatus UE in the collision notification message, in addition to the determination based on the resource, the collision determination unit 206 checks whether the collision notification message includes an ID of itself, and determines that there is a collision in the transmitted discovery signal when the ID of itself is not included.

The collision resolution unit 207 instructs the before-mentioned discovery signal generation unit 208 and the transmission unit 209 to perform, for example, the before-mentioned collision resolution operation when the collision determination unit 206 determines that there is a collision in the discovery signal transmitted by itself.

The discovery signal generation unit 208 generates a discovery signal. The transmission unit 209 transmits the discovery signal generated by the discovery signal generation unit 208 using a given radio resource. Also, the transmission unit 209 transmits a collision notification message generated by the collision notification generation and resource selection unit 205.

<Process Flow of the User Apparatus UE>

Figure 17:
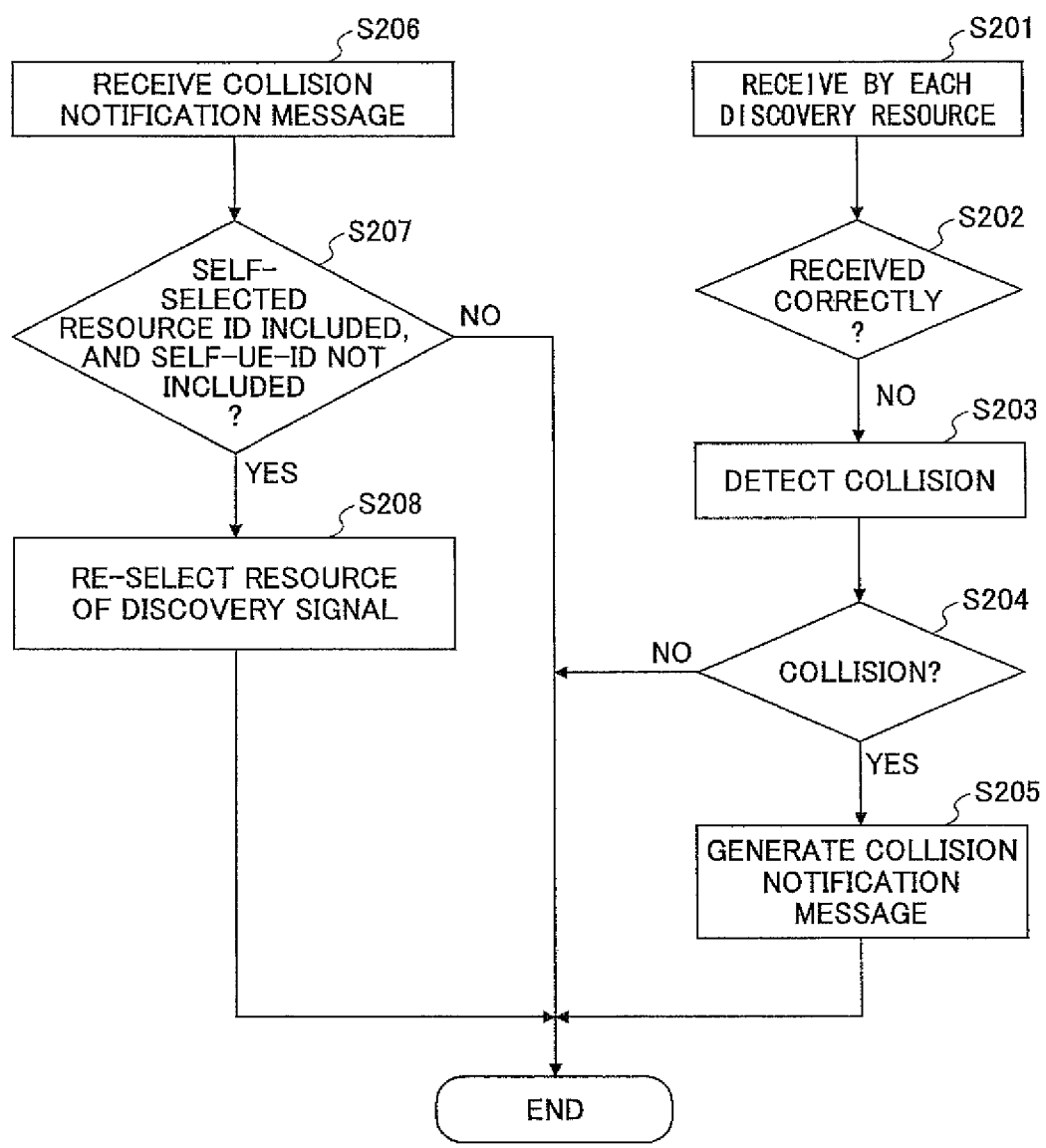
FIG. 17 is a flowchart showing operation of the user apparatus UE in the second embodiment.

Next, with reference to a flowchart of FIG. 17, an example of operation of the user apparatus UE in the present embodiment is described.

The user apparatus performs reception of a discovery signal in each resource (discovery resource) (step 201). When the discovery signal decoder 203 does not receive all discovery signals correctly (No in step 202), the process goes to step 203.

In step 203, the collision detection unit 204 determines whether there is a collision based on the size of received energy (received power, received radio wave strength and the like) of a resource where the signal is received, for example. When it is determined that there is a collision (Yes in step 204), the discovery signal generation and resource selection unit 205 generates a discovery notification message having an ID of a resource where the collision is detected, and the transmission unit 209 transmits the collision notification message (step 205).

In step 206, when the user apparatus UE receives a collision notification message, the collision determination unit 206 determines whether the collision notification message includes a resource ID of a resource selected by itself for transmitting a discovery signal and the collision notification message does not include information corresponding to UE-ID of itself (step 207). In a case where the system is configured not to include information corresponding to UE-ID, it may be determined that there is a collision when the collision notification message includes the resource ID of the resource selected by itself for transmitting a discovery signal.

When the determination of step 207 is Yes, it is determined that there is a collision in a discovery signal transmitted by itself. In this case the process goes to step 208, so that the user apparatus UE performs collision resolution operation. In this example, the user apparatus UE reselects a resource and transmits a discovery signal.

Third Embodiment

Process Content

Figure 18:
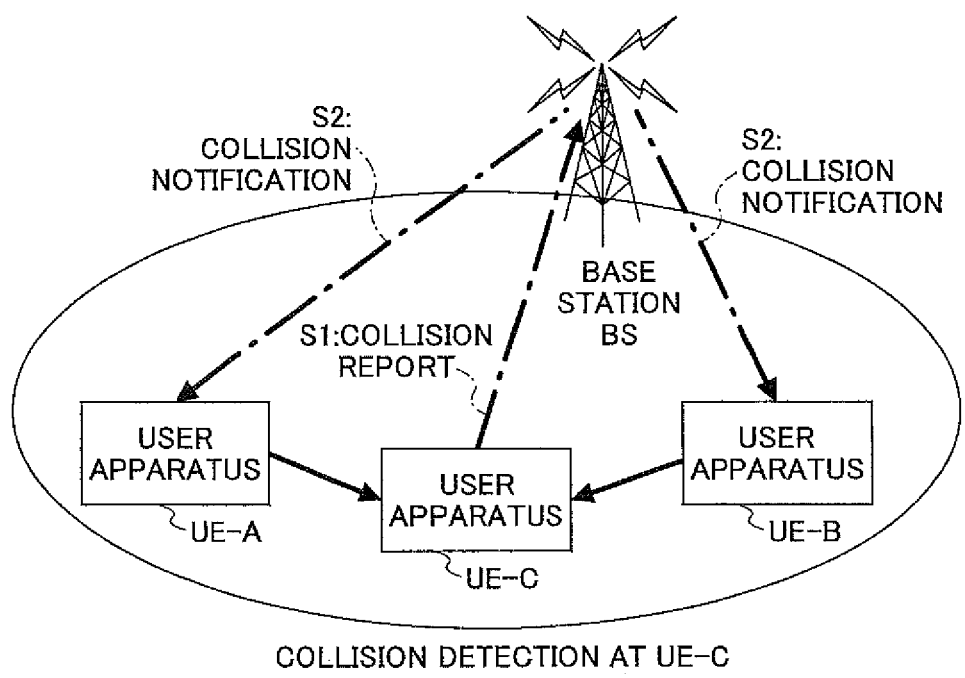
FIG. 18 is a diagram showing an outline of a third embodiment.

FIG. 18 shows an outline of the third embodiment. In the third embodiment, when the user apparatus UE detects a collision in a received signal, the user apparatus UE transmits a collision report message to a coordination node (step 1). As shown in FIG. 18, the coordination node is a base station BS, for example. But, the coordination node is not limited to a particular kind of node, and it may be another apparatus. For example, the coordination node may be another user apparatus UE. Also, as a coordination node, an apparatus that is assigned as a cluster head by the base station BS may be used.

Information to be included in the collision report message is the same as the information to be included in the collision notification message in the second embodiment. That is, an ID of a resource where a collision is detected is included in the collision report message. Also, an ID of a resource where a collision is detected and information corresponding to an ID of a user apparatus that is detected when the collision occurs may be included.

Also, in a case where the coordination node is a base station BS, a channel and the like to be used by the user apparatus UE for transmitting the collision report message is not limited to a particular type of channel.

For example, an UL signaling such as PRACH defined in LTE, LTE-Advanced and the like may be used, and, signaling such as RRC signaling or PUCCH command and the like may be newly defined and used.

As shown in FIG. 18, the coordination node (example: base station BS) that receives the collision report message transmits a collision notification message. The collision notification message is transmitted by broadcasting, for example. Also, the collision notification message includes information included in the collision report message. That is, the collision notification message includes an ID of a resource where a collision is detected for each resource where a collision is detected. Also, an ID of a resource where a collision is detected and information corresponding to an ID of a user apparatus that is detected when the collision occurs may be included.

In a case where the coordination node (example: base station BS) receives a plurality of collision report messages in a discovery period, all of the received collision report messages are collected and combined into a collision notification message. The collision notification message includes an ID of a resource where a collision is detected for each of a plurality of different collision detection resources received from a plurality of user apparatuses UE. Also, when the coordination node receives a plurality of collision report messages for a same resource from a plurality of user apparatuses UE, information of the resource ID in the plurality of collision report messages may be integrated so that the collision notification message includes one resource ID on the collisions of the resource.

Also, in a case where the coordination node is a base station BS, a channel and the like to be used by the base station BS for transmitting the collision notification message is not limited to a particular type of channel.

For example, a DL signaling such as PBCH defined in LTE, LTE-Advanced and the like may be used, and, signaling such as RRC signaling or PDCCH command and the like may be newly defined and used.

The user apparatus UE that receives the collision notification message transmitted from the coordination node determines whether there is a collision in a discovery signal transmitted by itself in the same way as the user apparatus UE that receives a collision indicator in the first embodiment. Then, when it is determined that there is a collision, operation for collision resolution is performed in the same way as the first embodiment (before-mentioned collision resolution operation examples 1-4).

<Configuration of User Apparatus UE>

Figure 19:
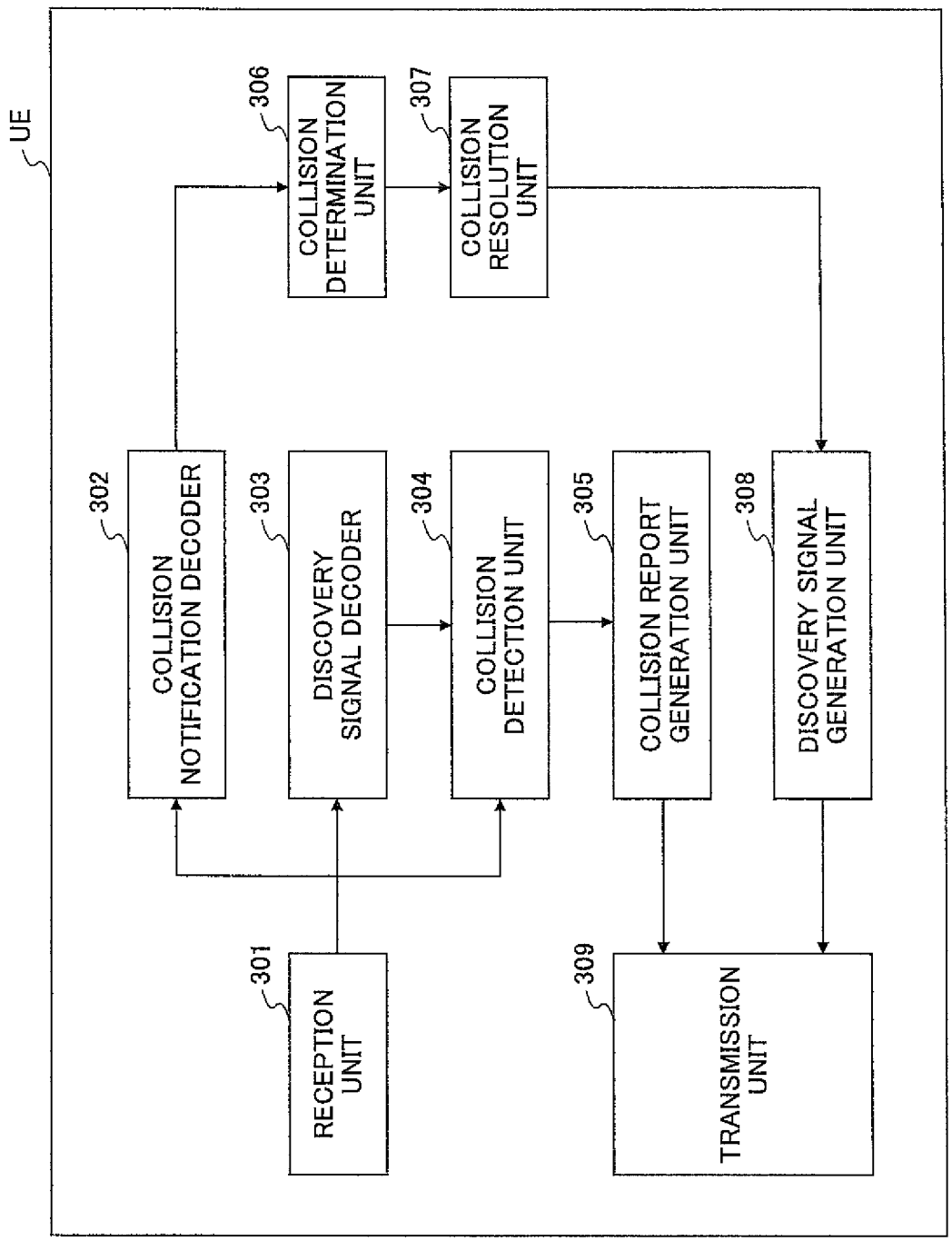
FIG. 19 is a functional block diagram of a user apparatus UE in the third embodiment.

FIG. 19 shows a functional block diagram of the user apparatus UE of the present embodiment. FIG. 19 especially shows functions related to collision detection and collision notification of discovery signals in the user apparatus UE. For example, the user apparatus UE may be further provided with a function necessary for the UE to operate as a UE complying with LTE (including LTE-Advanced).

As shown in FIG. 19, the user apparatus UE of the present embodiment includes a reception unit 301, a collision notification decoder 302, a discovery signal decoder 303, a collision detection unit 304, a collision report generation unit 305, a collision determination unit 306, a collision resolution unit 307, a discovery signal generation unit 308 and a transmission unit 309. Functions of each function unit is as follows.

The reception unit 301 receives a discovery signal and a collision notification message by using a given radio resource. The collision notification decoder 302 extracts resource ID, information corresponding to ID of UE and the like from the received collision notification message. The discovery signal decoder 303 performs processes for extracting an ID of a user apparatus UE that has transmitted a discovery signal from a received discovery signal.

The collision detection unit 304 performs detection whether there is a collision in a received discovery signal in the same way as the collision detection unit 103 of the first embodiment.

When a collision is detected in a received signal, the collision report generation unit 305 generates a collision report message having an ID of a resource where the collision is detected. In a case where a collision of a discovery signal is detected by the collision detection unit 304 and an ID of a user apparatus UE is detected by the discovery signal decoder 303, the collision report generation unit 305 may generate a collision report message including an ID of a resource where the collision is detected and information of an ID of the detected user apparatus UE. The collision report message is transmitted to the coordination node by the transmission unit 309.

The collision determination unit 306 determines whether there is a collision in a discovery signal transmitted by itself by determining whether the ID of the resource included in the received collision notification message from the coordination node indicates the resource of the discovery signal transmitted by itself (above-mentioned user apparatus UE). Also, in a case where the system is configured to include information of an ID of a detected user apparatus UE in the collision report message and the collision notification message, in addition to the determination based on the resource, the collision determination unit 306 checks whether the collision notification message includes an ID of itself, and determines that there is a collision when the ID of itself is not included.

The collision resolution unit 307 instructs the discovery signal generation unit 308 and the transmission unit 309 to perform, for example, the before-mentioned collision resolution operation when the collision determination unit 306 determines that there is a collision in the discovery signal transmitted by itself.

The discovery signal generation unit 308 generates a discovery signal. The transmission unit 309 transmits the discovery signal generated by the discovery signal generation unit 308 using a given radio resource. Also, the transmission unit 309 transmits a collision report message generated by the collision report generation unit 305 using a given radio resource.

A process flow of the user apparatus UE in the third embodiment is the same as the process flow in the second embodiment shown in FIG. 17. However, the third embodiment is different from the second embodiment in that, when the user apparatus UE detects a collision in a received signal, the user apparatus UE transmits a collision report message to a coordination node.

<Process Sequence>

Figure 20:
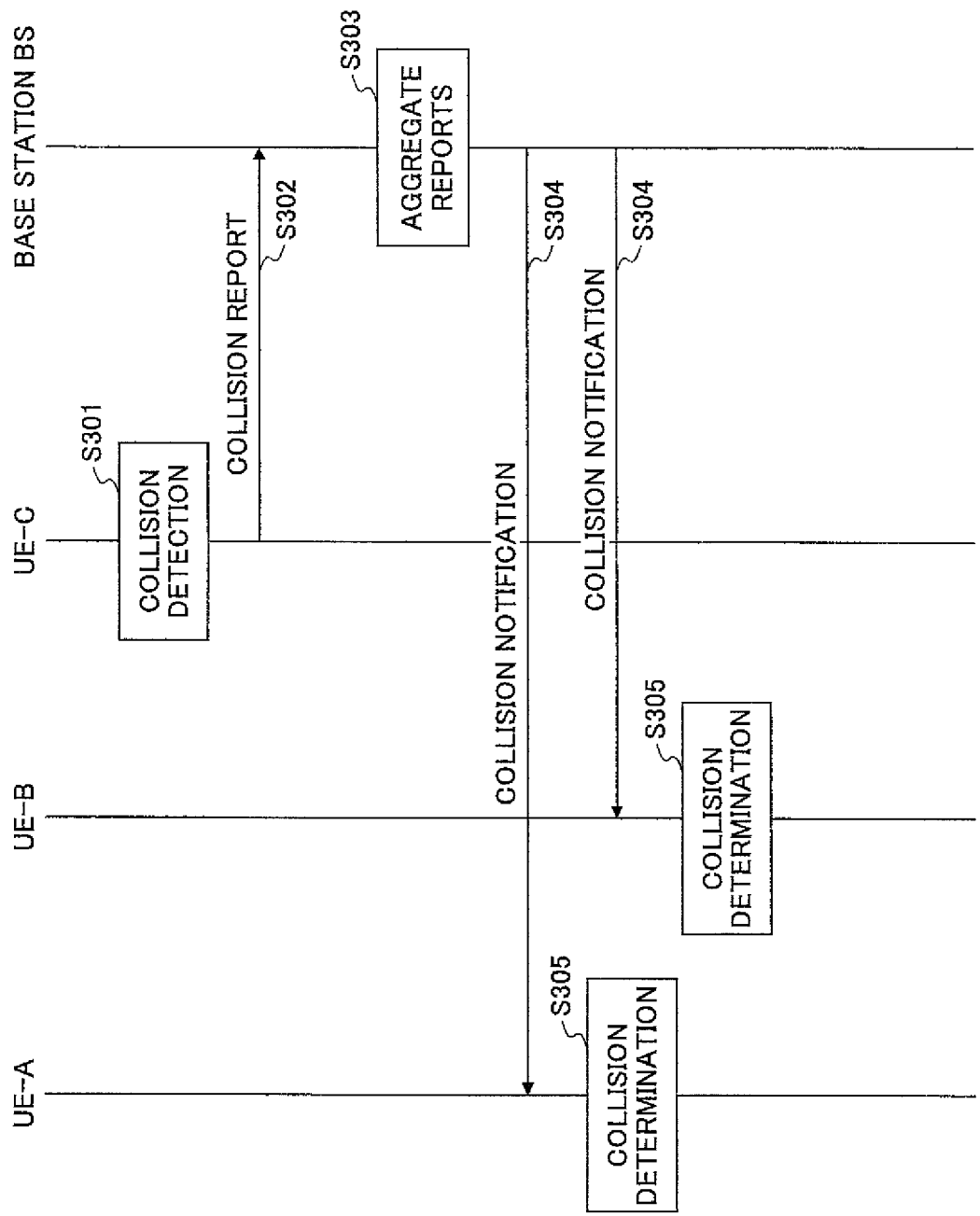
FIG. 20 is a flowchart showing operation of the user apparatus UE in the third embodiment.

FIG. 20 shows a process sequence example in the present embodiment. The example shown in FIG. 20 corresponds to an example in a case where the coordination node is the base station BS. Each user apparatus UE has a configuration shown in FIG. 19.

The user apparatus UE detects a collision for discovery signals transmitted from user apparatuses UE-A and UE-B, for example (step 301). Then, the collision report generation unit 305 of the user apparatus UE-A generates a collision report message, and the transmission unit 309 transmits a collision report message (step 302). In this example, the base station BS that is the coordination node receives collision report messages from a plurality of user apparatuses. UE. The base station BS combines the received collision report messages to generate a collision notification message, and transmit the collision notification message (step 304). In the example shown in FIG. 20, the user apparatuses UE-A and UE-B receives the collision notification message, and performs determination whether there is a collision in a discovery signal transmitted by itself respectively (step 305).

Summary of Embodiment, Effect and the Like

As described above, according to an embodiment of the present invention, there is provided a user apparatus UE that transmits and receives a discovery signal, including: collision detection means that detects a collision in a received discovery signal; collision notification means that, when a collision of a received discovery signal is detected by the collision detection means, transmits collision information indicating that a collision occurs in the received discovery signal; collision information reception means that receives collision information; and collision determination means that determines whether a collision occurs in a transmitted discovery signal transmitted by the user apparatus based on the collision information received by the collision information reception means.

The collision information may include identification information of a radio resource in which a collision is detected. Also, the collision information may further include information corresponding to an ID of a user apparatus detected in a received discovery signal.

For example, when identification information of a radio resource used for transmitting a transmitted discovery signal is included in collision information received by the collision information reception means, the collision determination means determines that a collision occurs in the transmitted discovery signal.

Also, for example, the collision notification means can include the collision information in a discovery signal, and transmit the discovery signal. In addition, the collision notification means may transmit, to a predetermined coordination node, collision information indicating occurrence of a collision in the received discovery signal.

Figure 1:
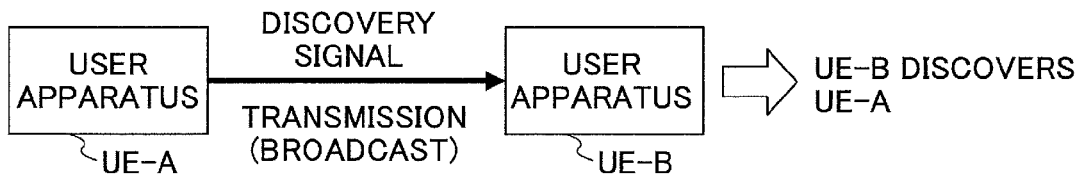
FIG. 1 is a diagram for explaining a technique for discovering a user apparatus UE by terminal to terminal communication.
Figure 2:
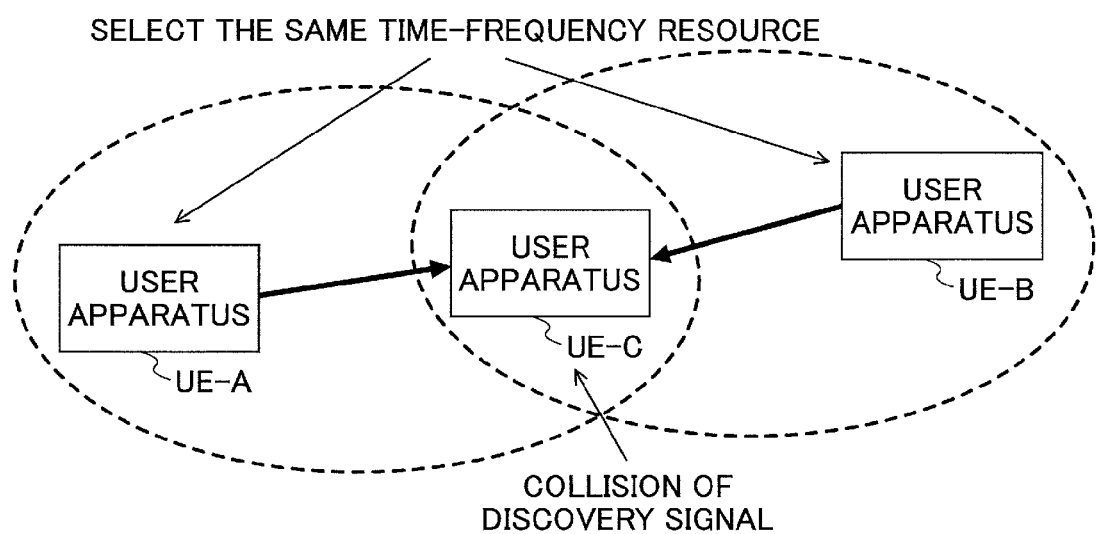
FIG. 2 is a diagram for explaining a conventional technique.
Figure 3:
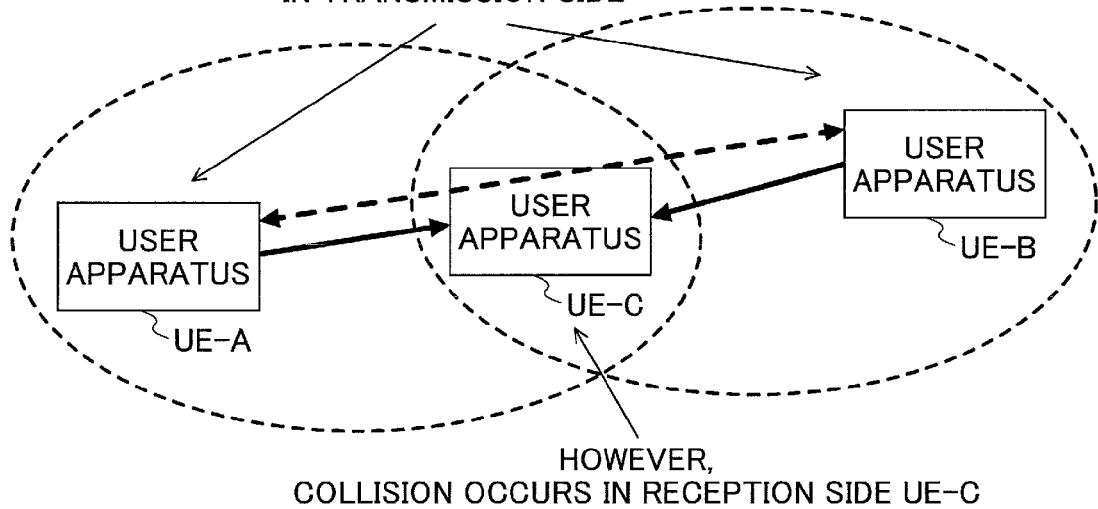
FIG. 3 is a diagram for explaining a conventional technique.
Figure 4:
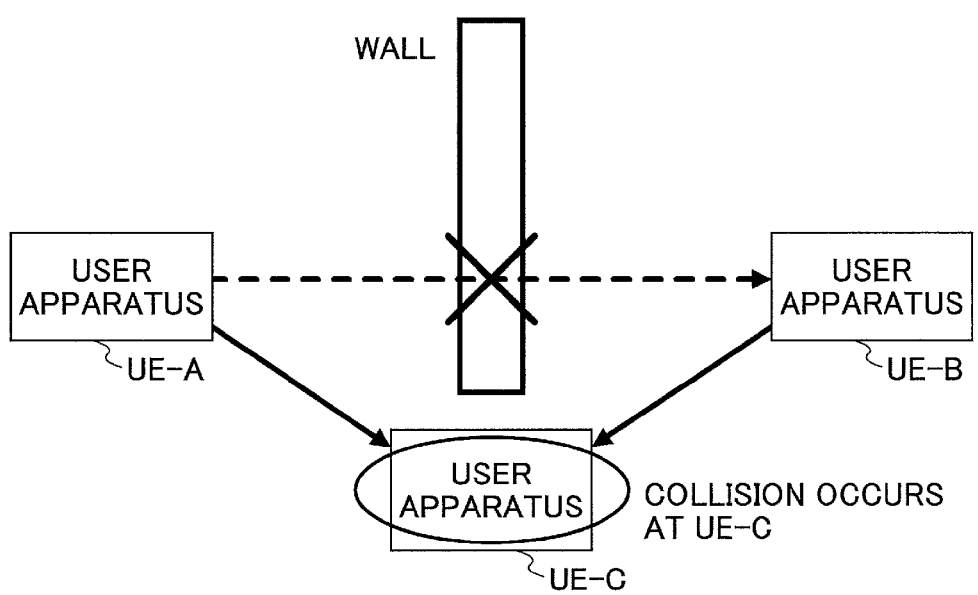
FIG. 4 is a diagram for explaining a problem in the conventional technique.

As mentioned above, in the present embodiment, a user apparatus UE that receives a discovery signal performs detection of a collision, and when there is a collision, the user apparatus UE transmits a message reporting occurrence of the collision. Therefore, according to the embodiment of the present invention, even in a case where there is wall between the user apparatus UE-A and the user apparatus UE-B as shown in FIG. 4, the user apparatus UE-C detects a collision, and notifies the user apparatus UE-A and the user apparatus UE-B of it, so that the user apparatus UE-A and the user apparatus UE-B can determine that there is a collision.

Figure 5:
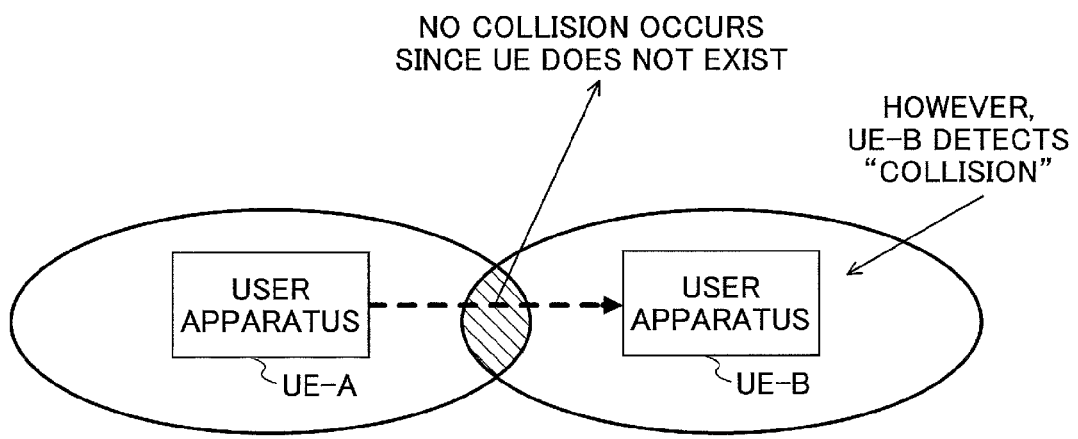
FIG. 5 is a diagram for explaining a problem in the conventional technique.

Also, in the case shown in FIG. 5, since there is no user apparatus in the dashed line area, it can be avoided that the user apparatus UE-A and the user apparatus UE-B erroneously detect a collision.

In the above, the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE has been explained by using functional block diagrams. However, the apparatus may be implemented in hardware, software, or a combination thereof. The software that operates according to the present invention (software executed by a processor provided in the user apparatus UE, software executed by a processor provided in the base station eNB) may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-079025, filed in the JPO on Apr. 4, 2013, and the entire contents of the Japanese patent application No. 2013-079025 are incorporated herein by reference.

DESCRIPTION OF REFERENCE SIGNS

CE user apparatus
BS base station
101 reception unit
102 discovery signal decoder
103 collision detection unit
104 collision determination unit
105 collision resolution unit
106 discovery signal generation unit
107 transmission unit
201 reception unit
202 collision notification decoder
203 discovery signal decoder
204 collision detection unit
205 collision notification generation and resource selection unit
206 collision determination unit
207 collision resolution unit
208 discovery signal generation unit
209 transmission unit
301 reception unit
302 collision notification decoder
303 discovery signal decoder
304 collision detection unit
305 collision report generation unit
306 collision determination unit
307 collision resolution unit
308 discovery signal generation unit
309 transmission unit

The invention claimed is:

1. A user apparatus that transmits and receives a discovery signal, comprising:
   a collision detection unit configured to detect a collision in a received discovery signal;
   a collision notification unit configured to, when a collision of a received discovery signal is detected by the collision detection unit, transmit collision information indicating that a collision occurs in the received discovery signal;
   a collision information reception unit configured to receive collision information; and
   a collision determination unit configured to determine whether a collision occurs in a transmitted discovery signal transmitted by the user apparatus based on the collision information received by the collision information reception unit,
   wherein the collision information includes identification information of a radio resource in which a collision is detected and information corresponding to an ID of a user apparatus detected in a received discovery signal.

2. The user apparatus as claimed in claim 1, wherein, when identification information of a radio resource used for transmitting a transmitted discovery signal is included in collision information received by the collision information reception unit, the collision determination unit determines that a collision occurs in the transmitted discovery signal.

3. The user apparatus as claimed in claim 1, wherein the collision notification unit includes the collision information in a discovery signal, and transmits the discovery signal.

4. The user apparatus as claimed in claim 1, wherein the collision notification unit transmits, to a predetermined coordination node, collision information indicating occurrence of a collision in the received discovery signal.

5. The user apparatus as claimed in claim 1, wherein the collision notification unit includes the collision information in a discovery signal, and transmits the discovery signal.

6. The user apparatus as claimed in claim 2, wherein the collision notification unit includes the collision information in a discovery signal, and transmits the discovery signal.

7. The user apparatus as claimed in claim 1, wherein the collision notification unit transmits, to a predetermined coordination node, collision information indicating occurrence of a collision in the received discovery signal.

8. The user apparatus as claimed in claim 2, wherein the collision notification unit transmits, to a predetermined coordination node, collision information indicating occurrence of a collision in the received discovery signal.

9. A collision detection method executed by a user apparatus that transmits and receives a discovery signal, comprising:
   a collision detection step of detecting a collision in a received discovery signal; and
   a collision notification step of, when a collision of a received discovery signal is detected by the collision detection step, transmitting collision information indicating that a collision occurs in the received discovery signal,
   wherein the collision information includes identification information of a radio resource in which a collision is detected and information corresponding to an ID of a user apparatus detected in a received discovery signal.

10. The collision detection method as claimed in claim 9, wherein, when detecting a collision in a transmitted discovery signal, the collision detection method comprises:
   a collision information reception step of receiving collision information; and
   a collision determination step of determining whether a collision occurs in a transmitted discovery signal transmitted by the user apparatus based on the collision information received by the collision information reception step.

* * * * *